United States Patent
Lee et al.

(10) Patent No.: US 9,817,494 B2
(45) Date of Patent: Nov. 14, 2017

(54) METHOD FOR CONVERTING CONTROL INPUT OF INPUT DOMAIN INTO CONTROL OUTPUT OF CONTROL DOMAIN USING VARIABLE CONTROL RESOLUTION TECHNIQUE, AND RELATED CONTROL APPARATUS THEREOF

(75) Inventors: Ping-Han Lee, Taipei (TW); Chia-Ping Chen, Nantou County (TW); Yu-Ting Chen, Taipei (TW); Yu-Pao Tsai, Kaohsiung (TW); Shaw-Min Lei, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 477 days.

(21) Appl. No.: 13/439,862

(22) Filed: Apr. 5, 2012

(65) Prior Publication Data

US 2013/0063374 A1    Mar. 14, 2013

Related U.S. Application Data

(60) Provisional application No. 61/533,760, filed on Sep. 12, 2011.

(51) Int. Cl.
*G06F 3/038* (2013.01)
*G06F 3/03* (2006.01)

(52) U.S. Cl.
CPC ............ *G06F 3/038* (2013.01); *G06F 3/0304* (2013.01)

(58) Field of Classification Search
CPC .... G06F 3/038; G06F 3/03548; G06F 3/0354; G06F 3/0488; G06F 3/0338; G06F 3/0481; G06F 3/04892; G06F 3/017
USPC .................................................. 345/173–178
See application file for complete search history.

(56) References Cited

U.S. PATENT DOCUMENTS

| | | | |
|---|---|---|---|
| 5,424,756 A * | 6/1995 | Ho et al. ........................ | 345/158 |
| 8,164,582 B2 | 4/2012 | North | |
| 2003/0222856 A1* | 12/2003 | Fedorak et al. .............. | 345/173 |
| 2004/0263472 A1* | 12/2004 | Tachikawa .............. | G06F 3/038 |
| | | | 345/156 |
| 2008/0007519 A1* | 1/2008 | Mellot et al. ................. | 345/156 |
| 2008/0120577 A1* | 5/2008 | Ma et al. ...................... | 715/863 |
| 2010/0199221 A1 | 8/2010 | Yeung | |
| 2011/0102570 A1* | 5/2011 | Wilf ........................ | G06F 3/017 |
| | | | 348/77 |
| 2011/0154201 A1 | 6/2011 | Nakanishi | |

FOREIGN PATENT DOCUMENTS

CN       101553777 A     10/2009

* cited by examiner

*Primary Examiner* — Richard Hong
(74) *Attorney, Agent, or Firm* — Winston Hsu

(57) ABSTRACT

An exemplary method for determining a control output in a control domain includes: obtaining a control input of an input domain, wherein the control input includes a previous input value and a current input value; and dynamically adjusting a control resolution setting, and converting the control input of the input domain into the control output in the control domain according to the control resolution setting, wherein the control output includes a previous output value and a current output value corresponding to the previous input value and the current input value, respectively, the control resolution setting for the current input value is determined according to at least the previous input value, and the current output value is identical to the previous output value when the current input value and the previous input value are generated in response to a same user input.

6 Claims, 18 Drawing Sheets

(A)

Algorithm 1

(B)

Algorithm 2

(C)

Algorithm 3

METHOD FOR CONVERTING CONTROL INPUT OF INPUT DOMAIN INTO CONTROL OUTPUT OF CONTROL DOMAIN USING VARIABLE CONTROL RESOLUTION TECHNIQUE, AND RELATED CONTROL APPARATUS THEREOF

CROSS REFERENCE TO RELATED APPLICATIONS

This application claims the benefit of U.S. provisional application No. 61/533,760, filed on Sep. 12, 2011 and incorporated herein by reference.

BACKGROUND

The disclosed embodiments of the present invention relate to achieving high-resolution control by using a low-resolution input, and more particularly, to a method for converting a control input of an input domain (e.g., an image-based object tracking domain) into a control output of a control domain using a variable control resolution technique and related control apparatus thereof.

Remote controls have been conventionally used to control electronic devices such as televisions. Remote controls facilitate control of the electronic devices. However, as electronic devices have become more complicated than before, the number of buttons of the remote controls has consequently increased in order to properly control the electronic devices. Thus, it is not easy to remember all the functions assigned to the respective buttons.

In order to solve this problem, several methods have been proposed to control an electronic device in an easy and convenient manner. For example, an image capturing apparatus may be attached to a display device (e.g., a television) for capturing a scene having the user included therein and accordingly generating a captured image for further processing. Next, the position of user's hand is detected by analyzing the captured image using an appropriate image processing algorithm. After the hand position is successfully identified, the position of a cursor shown on a display screen of the display device is controlled according to the detected hand position.

In general, the resolution of the captured image (e.g., 640×480 or 320×240) is lower than the resolution of the display screen (e.g., 1920×1080). Hence, pixel-level precision mapping between the high-resolution display screen and the low-resolution captured image is not possible physically. One conventional design linearly maps the hand position to the cursor position. However, the control resolution is low due to large resolution discrepancy between the captured image and the display screen. For example, a slight movement of user's hand would make the cursor have a large displacement on the display screen. Hence, it is not easy for the user to have fine control over movement of the cursor.

SUMMARY

In accordance with exemplary embodiments of the present invention, a method for converting a control input of an input domain (e.g., an image-based object tracking domain) into a control output of a control domain using dynamic control resolution technique and related control apparatus thereof are proposed, to solve the above-mentioned problems.

According to a first aspect of the present invention, an exemplary method for determining a control output in a control domain is disclosed. The exemplary method includes: obtaining a control input of an input domain, wherein the control input includes at least a previous input value and a current input value; and dynamically adjusting a control resolution setting which defines a number of units changed in the control domain when a unit is changed in the input domain, and converting the control input of the input domain into the control output in the control domain according to the control resolution setting, wherein the control output includes at least a previous output value and a current output value corresponding to at least the previous input value and the current input value, respectively, the control resolution setting for the current input value is determined according to at least the previous input value, and the current output value is identical to the previous output value when the current input value and the previous input value are generated in response to a same user input.

According to a second aspect of the present invention, an exemplary control apparatus for determining a control output in a control domain is disclosed. The exemplary control apparatus includes a receiving circuit and a processing circuit. The receiving circuit is arranged for obtaining a control input of an input domain, wherein the control input includes at least a previous input value and a current input value. The processing circuit is arranged for dynamically adjusting a control resolution setting which defines a number of units changed in the control domain when a unit is changed in the input domain, and converting the control input of the input domain into the control output in the control domain according to the control resolution setting, wherein the control output includes at least a previous output value and a current output value corresponding to at least the previous input value and the current input value, respectively, the control resolution setting for the current input value is determined according to at least the previous input value, and the current output value is identical to the previous output value when the current input value and the previous input value are generated in response to a same user input.

According to a third aspect of the present invention, an exemplary method for determining a control output in a control domain is disclosed. The exemplary method includes: obtaining a control input of an image-based object tracking domain; and dynamically adjusting a control resolution setting which defines a number of units changed in the control domain when a unit is changed in the image-based object tracking domain, and converting the control input of the image-based object tracking domain into the control output in the control domain according to the control resolution setting.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
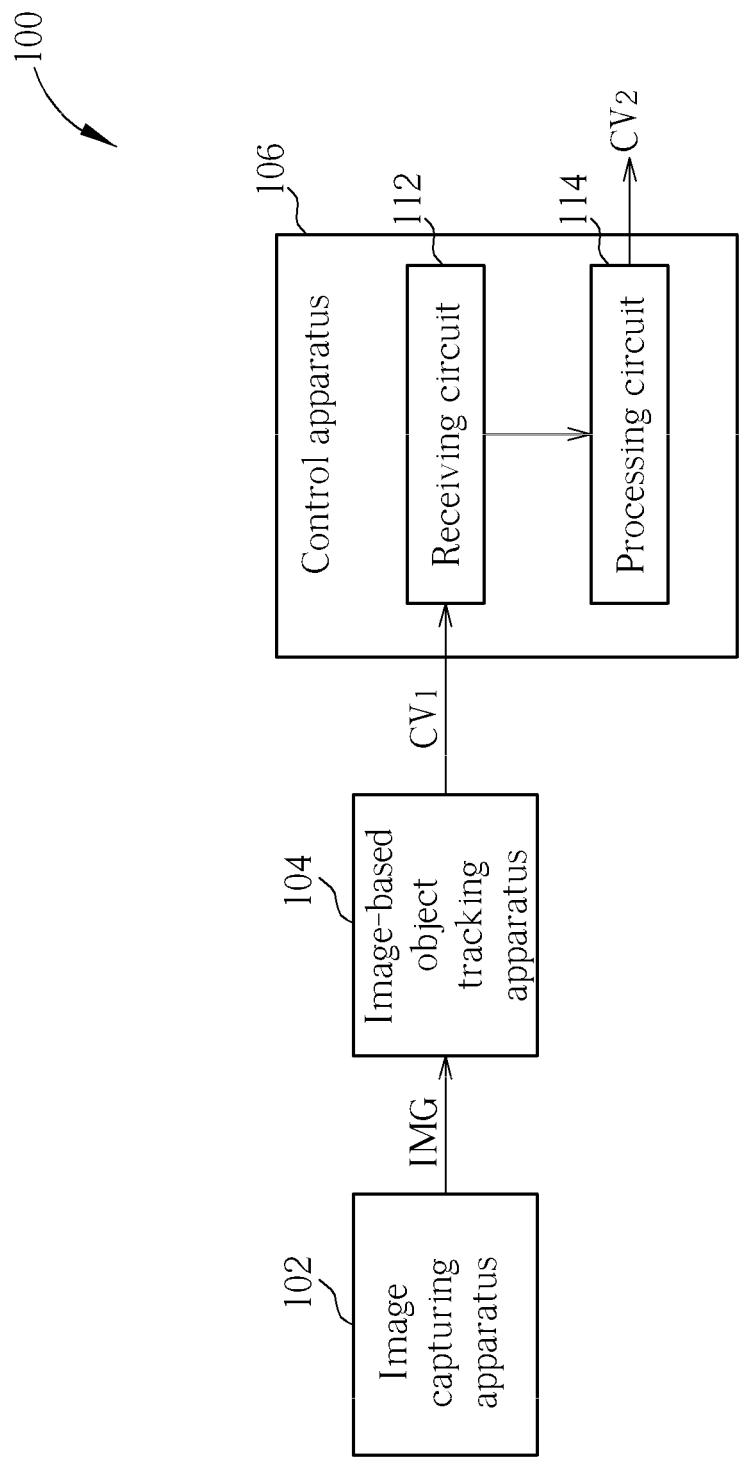
FIG. 1 is a block diagram illustrating a user input system according to an exemplary embodiment of the present invention.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The main conception of the present invention is to employ a variable control resolution scheme for achieving the control in a high-resolution domain with a user input in a low-resolution domain. By way of example, a dynamic virtual panel is introduced by the present invention to realize the variable control resolution scheme. In this way, the user experience is greatly improved as the user is capable of conveniently controlling movement of a cursor on a display screen by hands. Besides, as a low-resolution input device is employed to achieve the high-resolution control, the computational cost is low.

In the following, an exemplary user input system with image-based object tracking is provided for illustration of the proposed control apparatus which is capable of converting a control input of an input domain (e.g., an image-based object tracking domain) into a control output of a control domain using a variable control resolution technique. However, using the image-based object tracking domain as the input domain is for illustrative purposes only, and is not meant to be a limitation of the present invention. That is, the proposed control apparatus is not limited to the image-based object tracking application, and the coordinate input to be processed by the proposed control apparatus is not limited to an output of an image-based object tracking apparatus. By way of example, the proposed control apparatus may be employed in an application which desires a high-resolution control in a control domain by using a low-resolution input generated from any input domain. For example, the input domain may be a touch panel domain, the control input of the touch panel domain includes a coordinate value of a contact object (e.g., a fingertip or a stylus) in the touch panel domain, the control output of the control domain includes a screen coordinate value of a display screen in the control domain, and a resolution of the display screen is higher than a resolution of the touch panel. These alternative designs all fall within the scope of the present invention. To put it simply, the proposed control apparatus is operable no matter whether the input domain is an image-based object tracking domain or not. In an alternative design, the proposed control apparatus is operable under the condition where the input domain is a touch panel domain.

FIG. 1 is a block diagram illustrating a user input system according to an exemplary embodiment of the present invention. The exemplary user input system 100 includes, but is not limited to, an image capturing apparatus 102, an image-based object tracking apparatus 104, and a control apparatus 106, wherein the control apparatus 106 has a receiving circuit 112 and a processing circuit 114 included therein. The image capturing apparatus 102 may be implemented by a camera attached to or integrated in an electronic device (e.g., a display apparatus), and is arranged for generating a captured image IMG. The image-based object tracking apparatus 104 is coupled to the image capturing apparatus 102, and arranged for generating a coordinate value $CV_1$ of a target tracked object (e.g., user's hand) within the captured image IMG in an image-based object tracking domain. For example, the image-based object tracking apparatus 104 employs an appropriate image processing algorithm to process/analyze information provided by the captured image IMG, and identifies the target tracked object within the captured image IMG. After the location of the target tracked object is determined, the coordinate value $CV_1$ is obtained accordingly.

In an alternative design, the image capturing apparatus 102 and the image-based object tracking apparatus 104 may be replaced with a touch panel. Thus, the touch panel outputs a coordinate value $CV_1$ of a contact object (e.g., a fingertip or a stylus) detected in a touch panel area in a touch panel domain. In other words, the captured image analyzed by the image-based object tracking apparatus is equivalent to the touch panel area detected by the touch panel application.

In this exemplary embodiment, the control apparatus 106 is coupled to an input apparatus operating in an input domain (e.g., the image-based object tracking apparatus 104 operating in an image-based object tracking domain, or the touch panel operating in a touch panel domain), and used for determining a control output in a control domain according to a control input in the input domain (e.g., the image-based object tracking domain or the touch panel domain). The receiving circuit 112 is arranged for obtaining the control input (e.g., the coordinate value $CV_1$ of the target tracked object) from the preceding image-based object tracking apparatus 104. The processing circuit 114 is coupled to the receiving circuit 112, and arranged for dynamically adjusting a control resolution setting which defines the number of units changed in the control domain when one unit is changed in the image-based object tracking domain, and converting the control input of the image-based object tracking domain (e.g., the coordinate value $CV_1$ of the target tracked object) into the control output in the control domain (e.g., a screen coordinate value $CV_2$ of a display screen). It should be note that using the control apparatus 106 to receive the coordinate value $CV_1$ generated in the image-based object tracking domain is merely one of the feasible embodiments of the present invention. Alternatively, the control apparatus 106 may be employed to receive and process the coordinate value $CV_1$ generated from a user input of an input domain different from the image-based object tracking domain. This also falls within the scope of the present invention. For example, in an alternative design, the receiving circuit 112 is arranged for obtaining the control input (e.g., the coordinate value $CV_1$ of the contact object) from the preceding touch panel, and the processing circuit 114 is arranged for dynamically adjusting a control resolution setting which defines the number of units changed in the control domain when one unit is changed in the touch panel domain, and converting the control input of the touch panel domain (e.g., the coordinate value $CV_1$ of the contact object) into the control output in the control domain (e.g., a screen coordinate value $CV_2$ of a display screen).

For example, the control resolution setting may include one or more control resolutions, each defining the number of units changed in a particular dimension of the control domain when one unit is changed in the same particular dimension of the image-based object tracking domain. Based on the screen coordinate value $CV_2$, the location of a cursor on the display screen is determined. Thus, the cursor would be controlled to move on the display screen in response to movement of the target tracked object (e.g., user's hand). In a case where the resolution of the captured image IMG is lower than the resolution of the display screen, a high-resolution control output is therefore achieved by using a low-resolution control input. As the control resolution setting is allowed to be dynamically adjusted, the user would have better control over the cursor of a user interface. For example, when user's hand is moving, the cursor may move rapidly or slowly, depending upon the variable control resolution setting. Further details of the control apparatus 106 are described as below.

As mentioned above, the processing circuit 114 is capable of adjusting the control resolution setting dynamically. By way of example, but not limitation, the processing circuit 114 may employ a dynamic virtual panel for determining the control resolution setting. It should be noted that the control domain and the image-based object tracking domain may be one-dimensional domains, two-dimensional domains, three-dimensional domains, or higher-dimensional domains. The dynamic virtual panel therefore should be configured according to the number of dimensions of the control domain/image-based object tracking domain. For example, when each of the control domain and the image-based object tracking domain is an N-dimensional domain, the dynamic virtual panel is N-dimensional, where N may be any positive integer.

Figure 2:
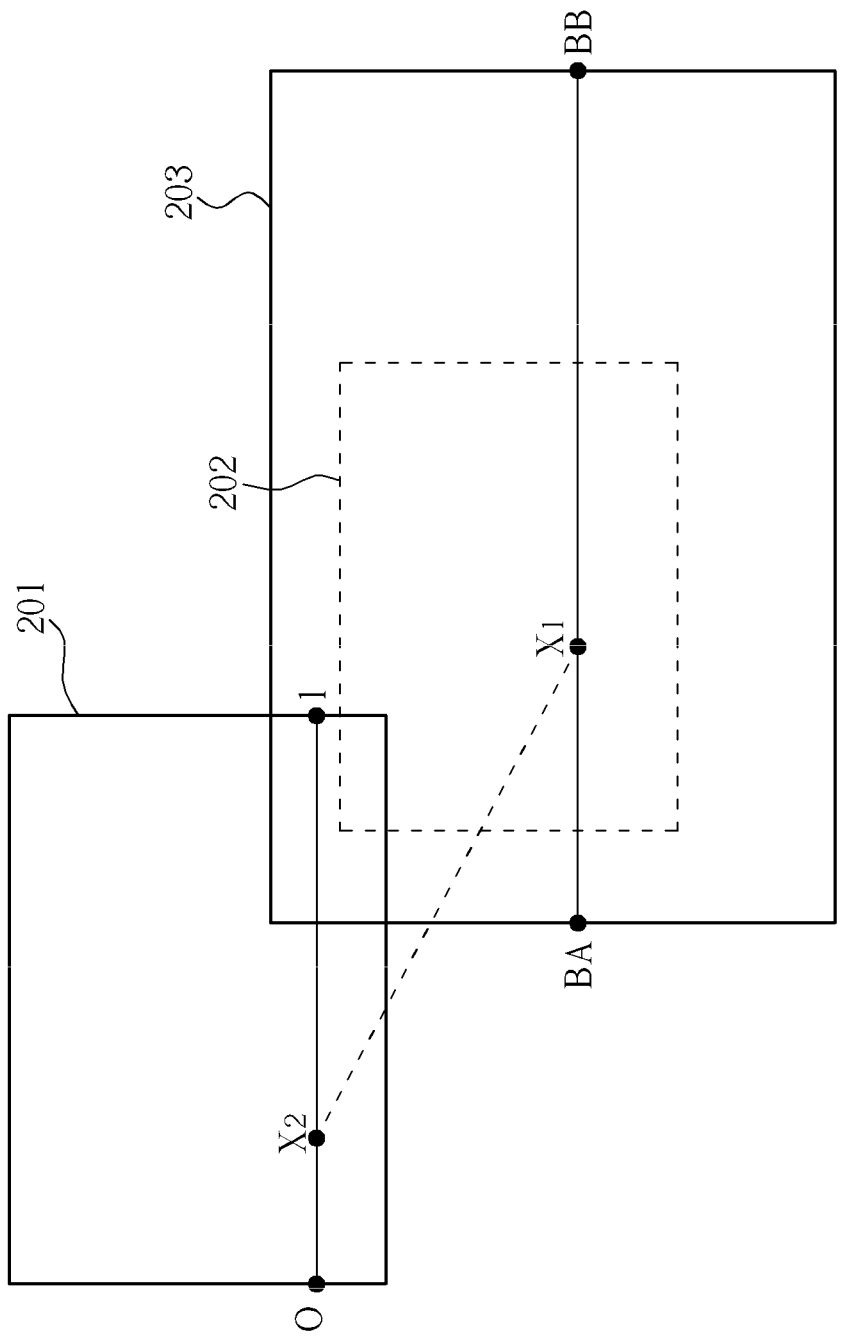
FIG. 2 is a diagram illustrating a dynamic virtual panel used for mapping a coordinate value of a target tracked object to a screen coordinate value of a display screen according to an exemplary embodiment of the present invention.

Please refer to FIG. 2, which is a diagram illustrating a dynamic virtual panel used for mapping a coordinate value of a target tracked object to a screen coordinate value of a display screen according to an exemplary embodiment of the present invention. In this example, as the display screen 201 and the captured image 202 are two-dimensional, each of the control domain and the image-based object tracking domain is a two-dimensional domain. Therefore, the employed dynamic virtual panel 203 is two-dimensional accordingly. As shown in FIG. 2, the resolution of the dynamic virtual panel 203 is higher than the resolution of the display panel 201, and the resolution of the display panel 201 is higher than the resolution of the captured image 202. Coordinates in the dynamic virtual panel 203 would be mapped to respective coordinates in the display panel 201. Supposing that the cursor position on the display screen 201 is normalized to [0, 1], the left boundary value (i.e., the lower bound value) BA and the right boundary value (i.e., the upper bound value) BB of the dynamic virtual panel 203 on the X-dimension would be mapped to X-coordinates 0 and 1 on the display panel 201, respectively. The coordinate value of the target tracked object (e.g., user's hand) identified in the captured image 202 has an X-coordinate $X_1$. Therefore, as can be seen from FIG. 2, the screen coordinate value of the display screen 201 has an X-coordinate $X_2$ which would be determined by the X-coordinate $X_1$ of the target tracked object and a mapping function of the dynamic virtual panel 203. Specifically, the control resolution may be changed when one or more of the size, position, and mapping function of the dynamic virtual panel 203 are adjusted.

In other words, the coordinate mapping between the image-based object tracking domain and the control domain is not fixed. For example, the control input of the image-based object tracking domain includes a previous input value (e.g., a previous hand position) and a current input value (e.g., a current hand position) sequentially obtained from the image-based object tracking apparatus 104. The dynamic virtual panel/control resolution setting is adjusted according to at least the previous input value. Next, the adjusted dynamic virtual panel/control resolution setting is used for converting the current input value into a corresponding current output value (e.g., a current cursor position) in the control domain. Several examples are provided hereinafter for illustration of control resolution adjustment.

In one exemplary design, the processing circuit 114 may refer to motion information of the control input in the image-based object tracking domain to dynamically adjust the control resolution setting. When the user wants rapid, large-scale cursor movement, he/she usually moves his/her hands quickly. Please refer to FIG. 3, which is a diagram illustrating an exemplary case where the size of the dynamic virtual panel is decreased to decrease the control resolution. At time $T_n$, the size of the dynamic virtual panel 303 is slightly smaller than the size of the captured image 302. The processing circuit 114 may obtain motion information of the control input in the image-based object tracking domain by analyzing coordinate values of the target tracked object respectively identified in successive captured images.

Figure 3:
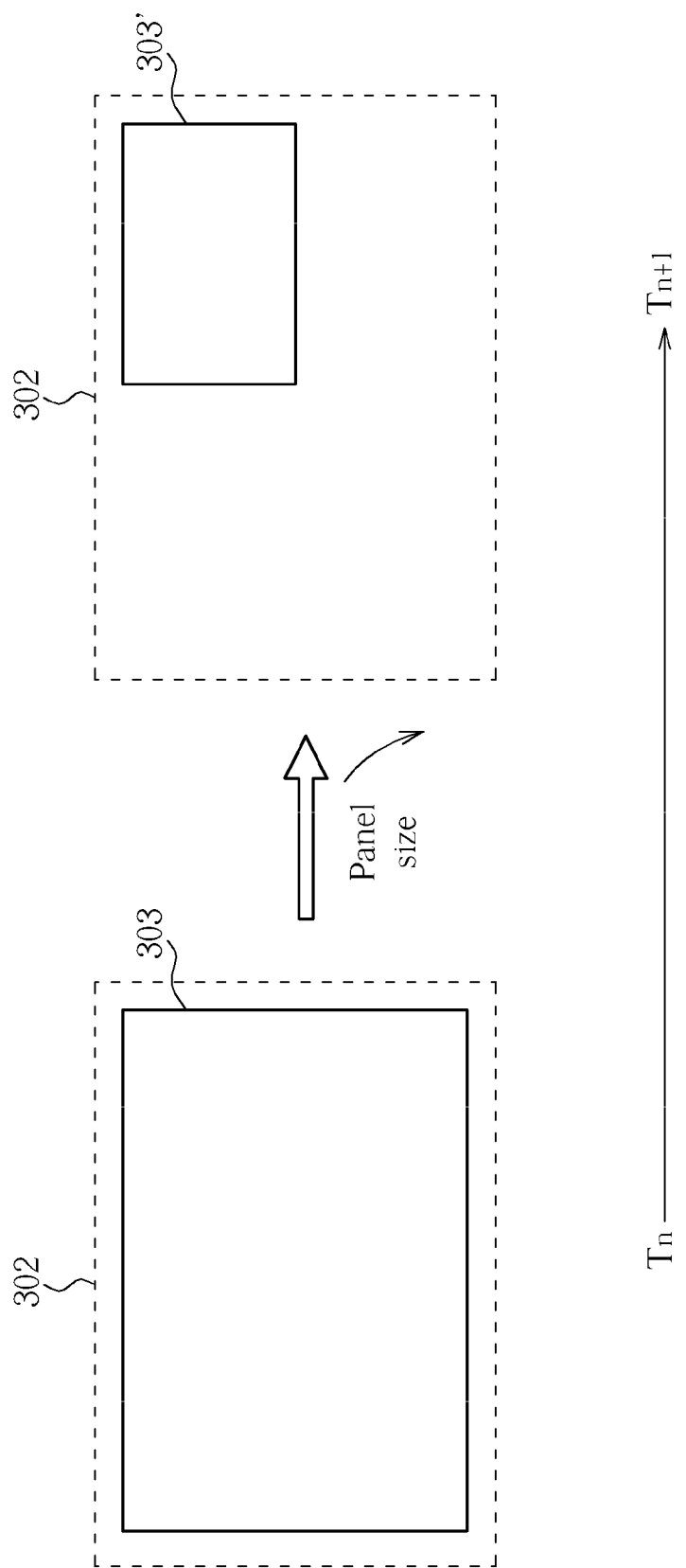
FIG. 3 is a diagram illustrating an exemplary case where the size of the dynamic virtual panel is decreased.

For example, the motion information includes at least one motion characteristic value which may be a velocity value, an acceleration value, or a measurement value of a high-order difference. When the processing circuit 114 detects that the target tracked object moves quickly, implying that the user wants rapid, large-scale cursor movement, the processing circuit 114 is operative to decrease the size/resolution of the dynamic virtual panel 303. Therefore, at time $T_{n+1}$, the size of the dynamic virtual panel 303' becomes much smaller than the size of the captured image 302, as shown in FIG. 3. As coordinates in the dynamic virtual panel 303' would be mapped to coordinates in a display panel (not shown), small-scale movement of the target tracked object in the captured image 302 would result in large-scale movement of the cursor in the display screen. In other words, the control resolution defined in the control resolution setting is reduced due to the fact that the number of units changed in the control domain is increased when a unit is changed in the image-based object tracking domain.

Figure 4:
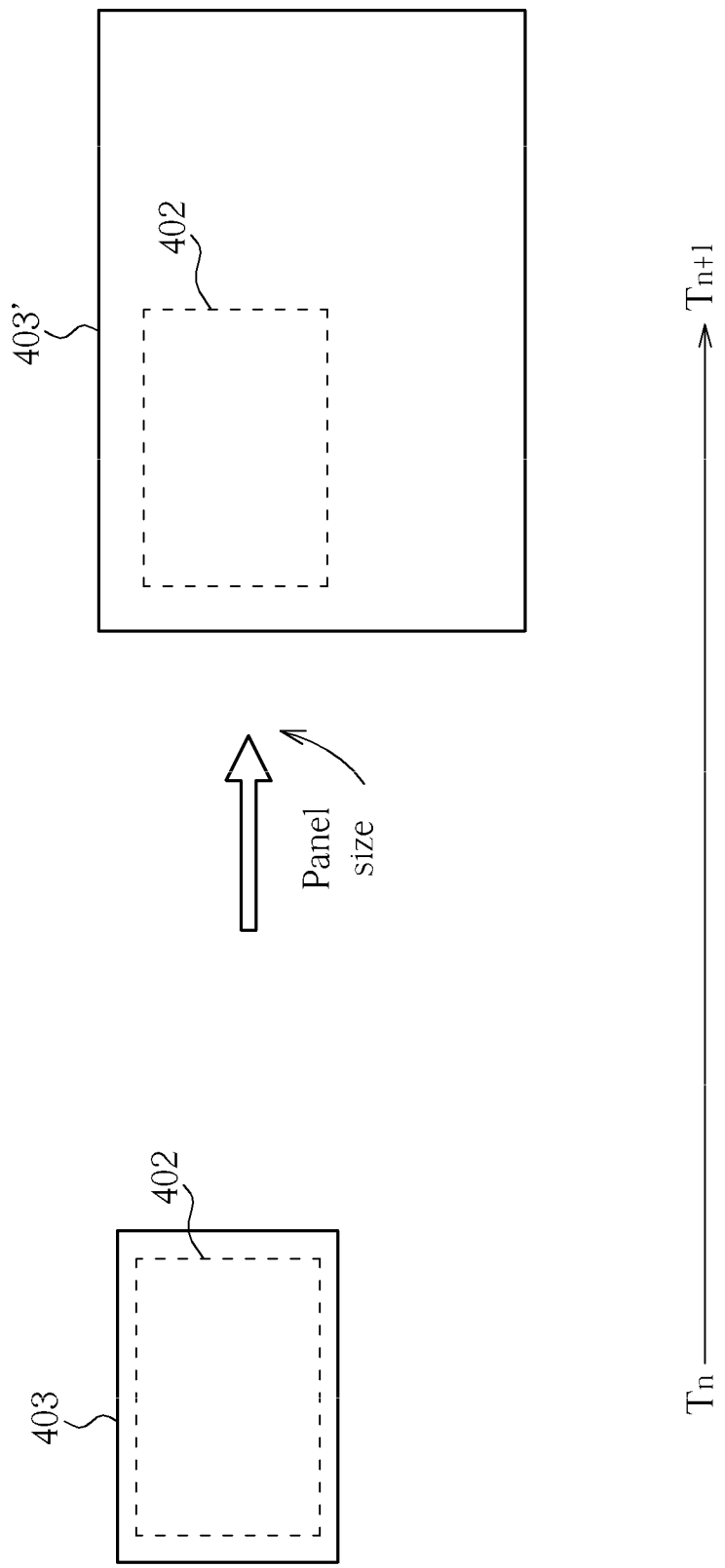
FIG. 4 is a diagram illustrating an exemplary case where the size of the dynamic virtual panel is increased.

When the user wants precise, small-scale cursor movement, he/she usually moves his/her hands slowly. Please refer to FIG. 4, which is a diagram illustrating an exemplary case where the size of the dynamic virtual panel is increased to enhance the control resolution. At time $T_n$, the size of the dynamic virtual panel 403 is slightly larger than the size of the captured image 402. When the processing circuit 114 detects that the target tracked object moves slowly, implying that the user wants precise, small-scale cursor movement, the processing circuit 114 is operative to increase the size/resolution of the dynamic virtual panel 403. Therefore, at time $T_{n+1}$, the size of the dynamic virtual panel 403' becomes much larger than the size of the captured image 402, as shown in FIG. 4. As coordinates in the dynamic virtual panel 403' would be mapped to coordinates in a display panel (not shown), small-scale movement of the target tracked object in the captured image 402 would result in small-scale movement of the cursor in the display screen. In other words, the control resolution defined in the control resolution setting is enhanced due to the fact that the number of units changed in the control domain is decreased when a unit is changed in the image-based object tracking domain.

Briefly summarized, at least an adjusted control resolution defined in the control resolution setting is inversely proportional to a motion characteristic value of the motion information. In this way, the control resolution is dynamically adjusted to meet user's different cursor control requirements.

Figure 5:
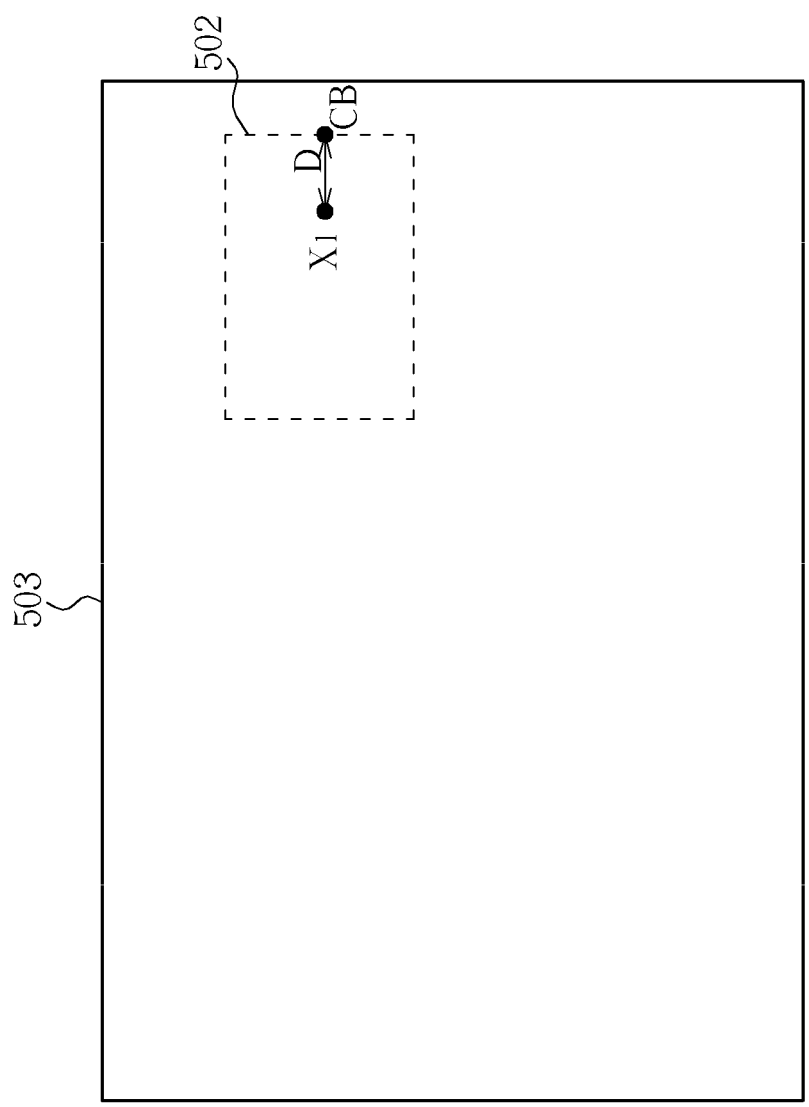
FIG. 5 is a diagram illustrating an exemplary case where an object (e.g., a target tracked object or a contact object) is close to the boundary of an area (e.g., a captured image or a touch area) in the input domain.

If user's hand is close to the boundary of the captured image while the size of the dynamic virtual panel is increasing, the user may find it difficult to reach the boundary of the dynamic virtual panel. Therefore, a protection scheme may be enabled when user's hand is found close to the boundary of the captured image. Please refer to FIG. 5, which is a diagram illustrating an exemplary case where an object (e.g., a target tracked object such as user's hand), or a contact object such as stylus or user's fingertip) is close to the boundary of an area (e.g., the captured image or the touch area) in the input domain. Regarding the image-based object tracking application, the processing circuit 114 may be configured to compare a difference D between the control input of the image-based object tracking domain (e.g., the X-coordinate $X_1$ of a target tracked object within a captured image 502 shown in FIG. 5) and a boundary of the captured image 502 (e.g., the right boundary/upper bound CB of the captured image 502 shown in FIG. 5) with a threshold TH, and accordingly generate a comparing result. For example, the threshold TH may be a predetermined value which is set beforehand. The comparing result would indicate whether user's hand is close to the boundary of the captured image 502. For example, when the difference D is found smaller than the threshold TH (i.e., D<TH), the processing circuit 114 enables the protection scheme to slow down the resizing rate of the dynamic virtual panel 503. To put it another way, the rate of change of at least one control resolution defined in the control resolution setting (e.g., the control resolution of the X-dimension) is decreased under the control of the processing circuit 114. In this way, the user would have chance to reach the boundary of the dynamic virtual panel which is resized slowly.

Figure 6:
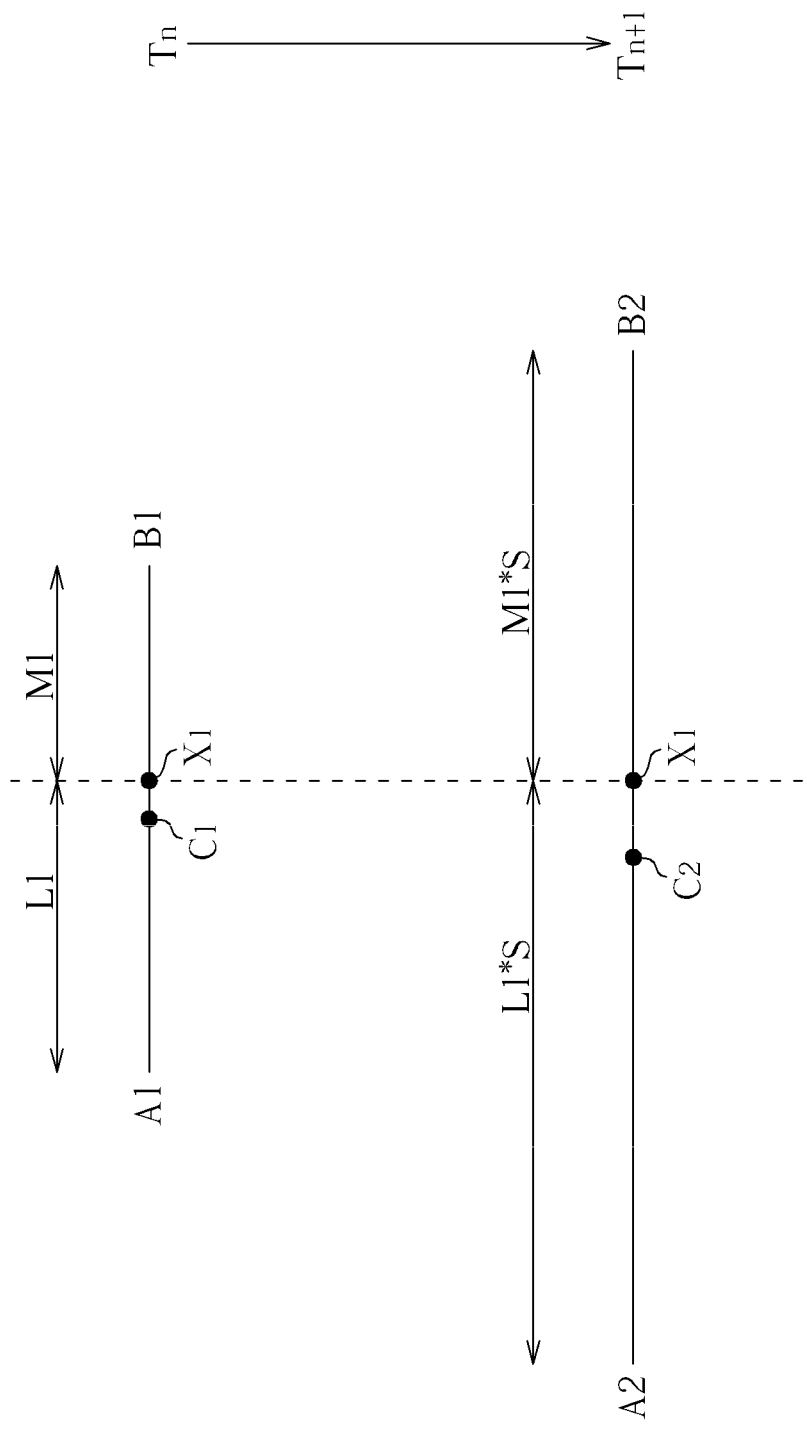
FIG. 6 is a diagram illustrating the panel position of the dynamic virtual panel that is determined by a first algorithm according to an exemplary embodiment of the present invention.

Regarding the adjustment made to the control resolution setting, the position and/or mapping function of the dynamic virtual panel may be changed by the processing circuit 114. Please refer to FIG. 6, which is a diagram illustrating the panel position of the dynamic virtual panel that is determined by a first algorithm according to an exemplary embodiment of the present invention. For simplicity and clarity, only one-dimensional adjustment made to a dynamic virtual panel is illustrated. As shown in FIG. 6, the dynamic virtual panel is divided into a left part and a right part according to the hand position (i.e., the X-coordinate $X_1$ of the target tracked object). At time $T_n$, the length of the left part (i.e., a distance between the left boundary/lower bound A1 of the dynamic virtual panel and the X-coordinate $X_1$) is L1, and the length of the right part (i.e., a distance between the right boundary/upper bound B1 of the dynamic virtual panel and the X-coordinate $X_1$) is M1, where the panel center $C_1$ is located at the left side of the X-coordinate $X_1$. The first algorithm employed by the processing circuit 114 determines the position of the adjusted dynamic virtual panel based on the hand position. Therefore, the left part and the right part of the dynamic virtual panel are resized with the same scaling factor S. As shown in FIG. 6, the panel center is shifted from $C_1$ to $C_2$ due to the fixed hand position. Specifically, at time $T_{n+1}$, the length of the resized left part (i.e., a distance between the left boundary/lower bound A2 of the adjusted dynamic virtual panel and the X-coordinate $X_1$) is L1*S, and the length of the resized right part (i.e., a distance between the right boundary/upper bound B2 of the adjusted dynamic virtual panel and the X-coordinate $X_1$) is M1*S.

It should be noted that the hand position is fixed, and the ratio between the left part and the right part is equal to the ratio between the resized left part and the resized right part $$\left(\text{i.e., } \frac{L1}{M1} = \frac{L1*S}{M1*S}\right).$$

Figure 7:
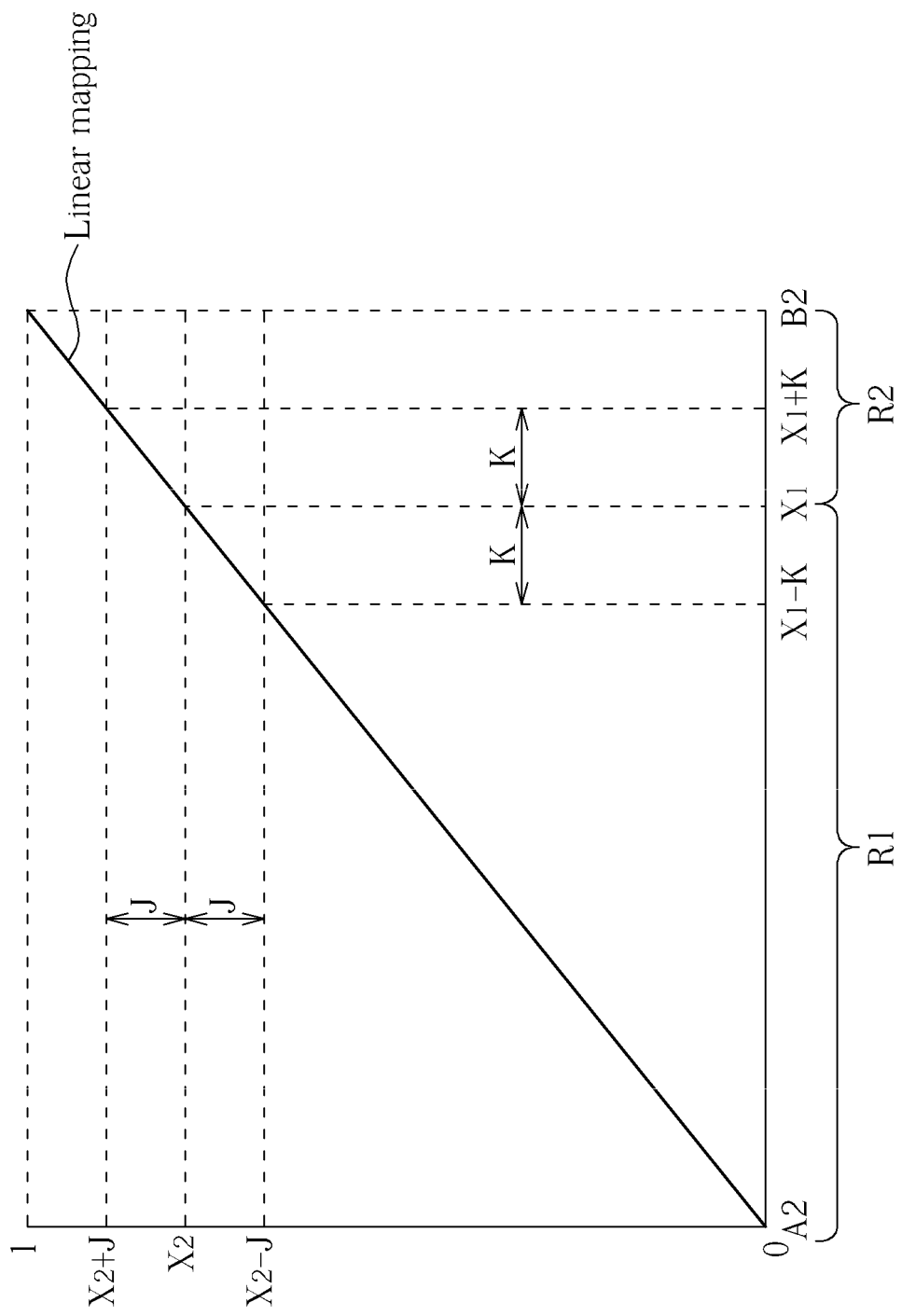
FIG. 7 is a diagram illustrating the mapping function of the dynamic virtual panel that is determined by the first algorithm according to an exemplary embodiment of the present invention.

Therefore, a linear mapping function may be employed by the adjusted dynamic virtual panel. Please refer to FIG. 7, which is a diagram illustrating the mapping function of the dynamic virtual panel that is determined by the first algorithm according to an exemplary embodiment of the present invention. Suppose that the X-coordinate $X_1$ of the hand position (i.e., a previous input value included in the control input of the image-based object tracking domain) is mapped to an X-coordinate $X_2$ of a cursor position on a display screen (i.e., a previous output value included in the control output of the control domain) at time $T_n$. In a case where the hand position is not changed at time $T_{n+1}$ (i.e., the previous input value and the current input value are generated in response to a same user input with an unchanged hand position), the linear mapping function of the adjusted dynamic virtual panel still maps the X-coordinate $X_1$ of the hand position (i.e., a current input value included in the control input of the image-based object tracking domain) to the X-coordinate $X_2$ of the cursor position (i.e., a current output value included in the control output of the control domain), thereby making the mapped cursor position unchanged after the panel resizing if user's hand does not move at all.

In another case where the X-coordinate of the changed hand position (i.e., the current input value in the image-based object tracking domain) is $X_1-K$ which is within a first input range R1 delimited by A2 and $X_1$, the processing circuit 114 converts the X-coordinate $X_1-K$ of the current hand position into an X-coordinate $X_2-J$ of the cursor position (i.e., the current output value in the control domain) according to an adjusted control resolution defined by the linear mapping function. In yet another case where the X-coordinate of the changed hand position (i.e., the current input value in the image-based object tracking domain) is $X_1+K$ which is within a second input range R2 delimited by B2 and $X_1$, the processing circuit 114 converts the X-coordinate $X_1+K$ of the current hand position into an X-coordinate $X_2+J$ of the cursor position (i.e., a current output value in the control domain) according to the same adjusted control resolution defined by the linear mapping function. It should be noted that the adjusted control resolution is set by the mapping slope of the linear mapping functions.

Figure 8:
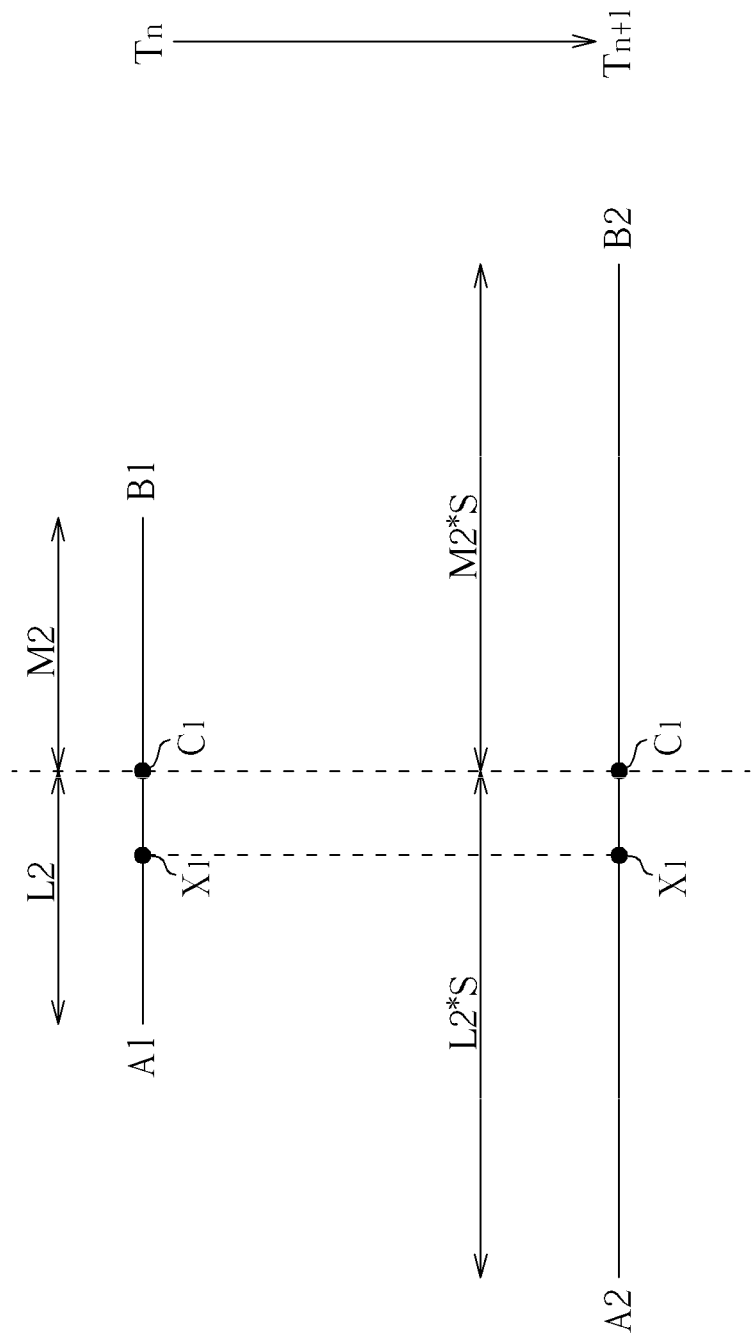
FIG. 8 is a diagram illustrating the panel position of the dynamic virtual panel that is determined by a second algorithm according to an exemplary embodiment of the present invention.

Please refer to FIG. 8, which is a diagram illustrating the panel position of the dynamic virtual panel that is determined by a second algorithm according to an exemplary embodiment of the present invention. For simplicity and clarity, only one-dimensional adjustment made to a dynamic virtual panel is illustrated. As shown in FIG. 8, the dynamic virtual panel is divided into a left part and a right part according to a reference position (e.g., a pre-defined position such as an initial panel center or an initial hand position when the processing circuit 114 starts executing the second algorithm). In this embodiment, the panel center $C_1$ acts as the reference position. The current hand position (i.e., the X-coordinate $X_1$ of the target tracked object) is at the left side of the reference position. At time $T_n$, the length of the left part (i.e., a distance between the left boundary/lower bound A1 of the dynamic virtual panel and the panel center $C_1$) is L2, and the length of the right part (i.e., a distance between the right boundary/upper bound B1 of the dynamic virtual panel and the panel center $C_1$) is M2. The second algorithm employed by the processing circuit 114 determines the position of the adjusted dynamic virtual panel based on the reference position. Therefore, the left part and the right part of the dynamic virtual panel are resized with the same scaling factor S. As shown in FIG. 8, the panel center $C_1$ of the dynamic virtual panel is not changed after panel resizing. Specifically, at time $T_{n+1}$, the length of the resized left part (i.e., a distance between the left boundary/lower bound A2 of the adjusted dynamic virtual panel and the panel center $C_1$) is L2*S, and the length of the resized right part (i.e., a distance between the right boundary/upper bound B2 of the adjusted dynamic virtual panel and the panel center $C_1$) is M2*S.

It should be noted that the reference position (e.g., the panel center) is fixed, and the ratio between the left part and the right part is equal to the ratio between the resized left part and the resized right part $$\left(\text{i.e.,} \frac{L2}{M2} = \frac{L2*S}{M2*S}\right).$$

This implies that the ratio of a distance between A1 and $X_1$ to a distance between B1 and $X_1$ is different from the ratio of a distance between A2 and $X_1$ to a distance between B2 and $X_1$ (unless $X_1=C_1$). Therefore, a piece-wise mapping function may be employed by the adjusted dynamic virtual panel. Please refer to FIG. 9, which is a diagram illustrating the mapping function of the dynamic virtual panel that is determined by the second algorithm according to an exemplary embodiment of the present invention. Suppose that the X-coordinate $X_1$ of the hand position (i.e., a previous input value included in the control input of the image-based object tracking domain) is mapped to an X-coordinate $X_2$ of a cursor position on a display screen (i.e., a previous output value included in the control output of the control domain) at time $T_n$. In a case where the hand position is not changed at time $T_{n+1}$ (i.e., the previous input value and the current input value are generated in response to a same user input with an unchanged hand position), the piece-wise mapping function of the adjusted dynamic virtual panel still maps the X-coordinate $X_1$ of the hand position (i.e., a current input value included in the control input of the image-based object tracking domain) to the X-coordinate $X_2$ of the cursor position (i.e., a current output value included in the control output of the control domain), thereby making the mapped cursor position unchanged after the panel resizing if user's hand does not move at all. In another case where the X-coordinate of the changed hand position (i.e., the current input value in the image-based object tracking domain) is $X_1-K$ which is within a first input range R1' delimited by A2 and $X_1$, the processing circuit 114 converts the X-coordinate $X_1-K$ of the current hand position into an X-coordinate $X_2-J_2$ of the cursor position (i.e., a current output value in the control domain) according to a first adjusted control resolution defined by a first mapping slope of the piece-wise mapping function.

In yet another case where the X-coordinate of the changed hand position (i.e., the current input value in the image-based object tracking domain) is $X_1+K$ which is within a second input range R2' delimited by B2 and $X_1$, the processing circuit 114 converts the X-coordinate $X_1+K$ of the current hand position into an X-coordinate $X_2+J_1$ of the cursor position (i.e., a current output value in the control domain) according to a second adjusted control resolution defined by a second mapping slop of the piece-wise mapping function, where $J_1 \neq J_2$ and the first adjusted control resolution is different from the second adjusted control resolution. It should be noted that the adjusted control resolution is set by the first mapping slope/second mapping slope of the linear mapping functions.

Figure 10:
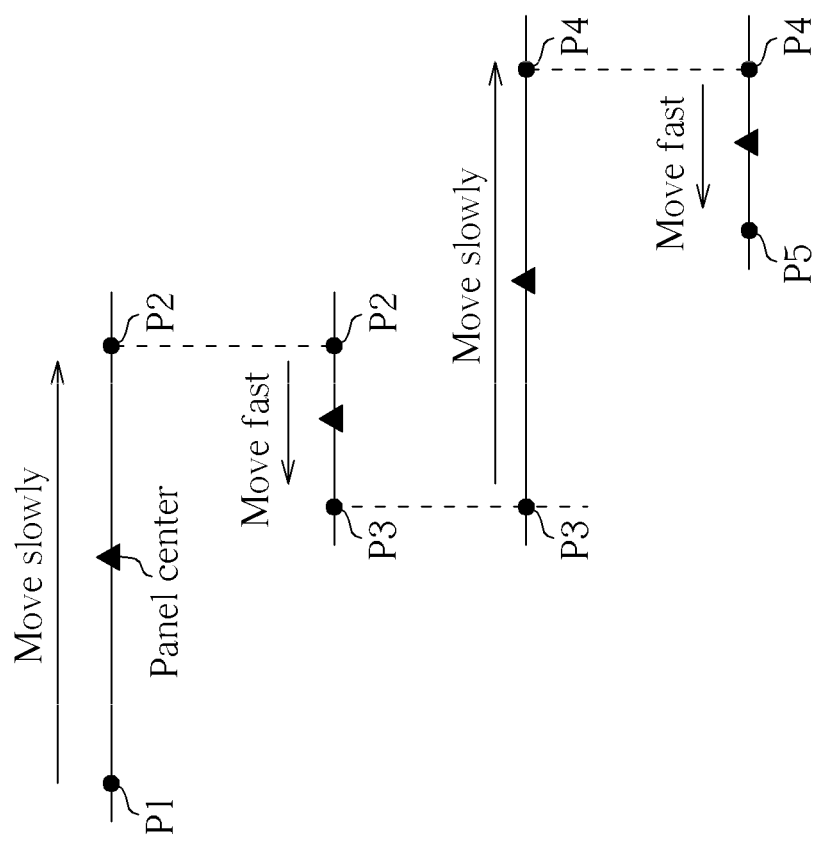
FIG. 10 is a diagram illustrating a case where the dynamic virtual panel moves far away from the user.

Regarding the first algorithm mentioned above, the cursor displacement is consistent for the same hand displacement in different moving directions due to the linear mapping function using a single mapping slope; however, the position of the dynamic virtual panel (e.g., the panel center of the dynamic virtual panel) will shift over time, causing the user not able to move the cursor to anywhere even with his/her arms fully stretched. Please refer to FIG. 10, which is a diagram illustrating a case where the dynamic virtual panel moves far away from the user. The user's hand moves from the current position P1 to the next position P2 slowly, thus making the dynamic virtual panel have a reduced panel size. Next, the user's hand moves from the current position P2 to the next position P3 fast, thus making the dynamic virtual panel have an increased panel size. Similarly, the user's hand moves from the current position P3 to the next position P4 slowly, thus making the dynamic virtual panel have a reduced panel size. Next, the user's hand moves from the current position P4 to the next position P5 fast. As can be seen from FIG. 10, the panel center, represented by a triangle mark, will move rightward.

Regarding the second algorithm mentioned above, the position of the dynamic virtual panel (e.g., the panel center of the dynamic virtual panel) will not shift over time; however, the cursor displacement is different for the same hand displacement in different moving directions due to the piece-wise mapping function using different mapping slops.

Figure 11:
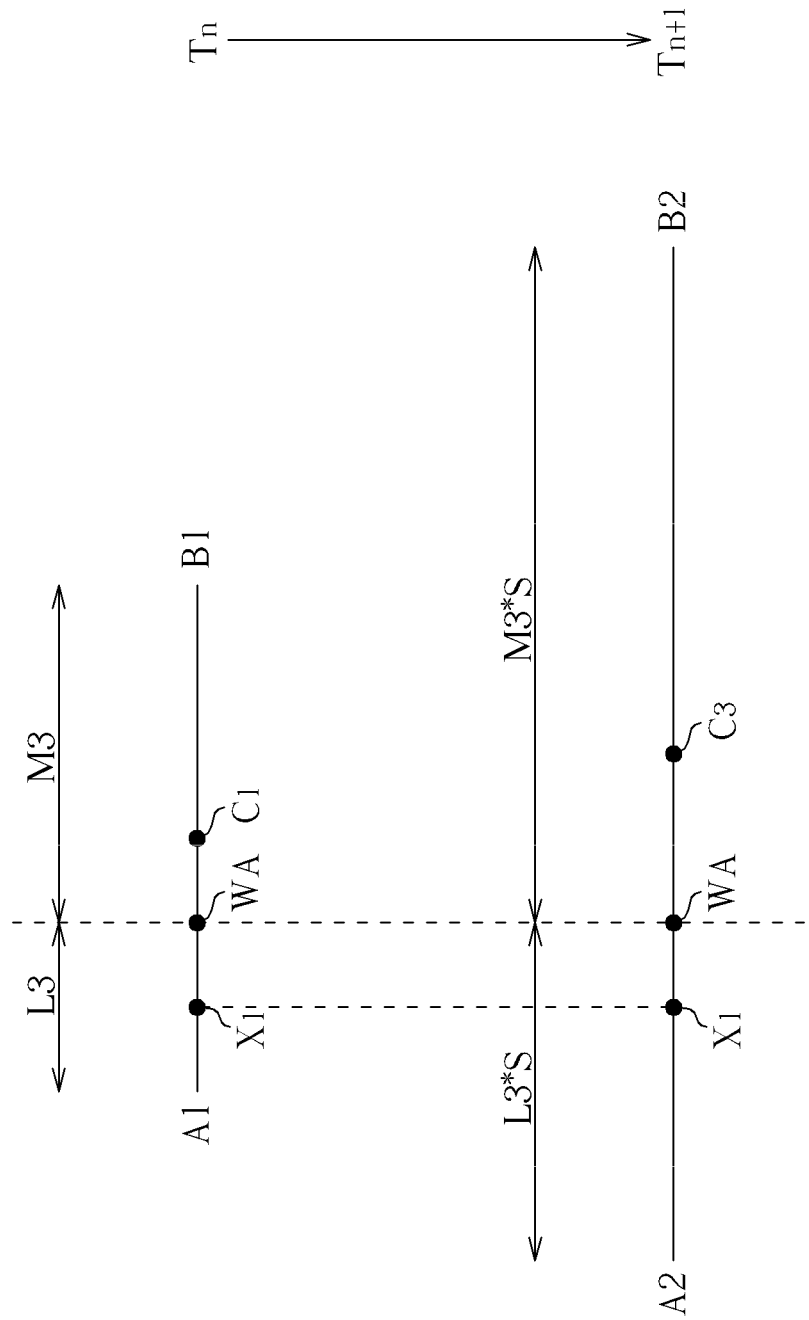
FIG. 11 is a diagram illustrating the panel position of the dynamic virtual panel that is determined by a third algorithm according to an exemplary embodiment of the present invention.

Thus, the present invention further proposes a third algorithm which is capable of gaining afore-mentioned advantages offered by the first algorithm and the second algorithm and mitigating afore-mentioned disadvantages possessed by the first algorithm and the second algorithm. Please refer to FIG. 11, which is a diagram illustrating the panel position of the dynamic virtual panel that is determined by a third algorithm according to an exemplary embodiment of the present invention. For simplicity and clarity, only one-dimensional adjustment made to a dynamic virtual panel is illustrated. As shown in FIG. 11, the dynamic virtual panel is divided into a left part and a right part based on a weighed average WA of the hand position (i.e., the X-coordinate $X_1$ of the target tracked object) and a reference position (e.g., a pre-defined position such as an initial panel center or an initial hand position when the processing circuit 114 starts executing the third algorithm), and the hand position (i.e., the X-coordinate $X_1$ of the target tracked object) is at the left side of the reference position (e.g., the panel center $C_1$ in this embodiment).

In this exemplary embodiment shown in FIG. 11, the weighting factor W1 of the X-coordinate $X_1$ is set by 0.5, and the weighting factor W2 of the panel center $C_1$ is set by 0.5. Therefore, the weighted average WA is equal to $0.5*X_1 + 0.5*C_1$. However, this is for illustrative purposes only, and is not meant to be a limitation of the present invention. At time $T_n$, the length of the left part (i.e., a distance between the left boundary/lower bound A1 of the dynamic virtual panel and the weighted average WA) is L3, and the length of the right part (i.e., a distance between the right boundary/upper bound B1 of the dynamic virtual panel and the weighted average WA) is M3. The third algorithm employed by the processing circuit 114 determines the position of the adjusted dynamic virtual panel based on the weighted average. Therefore, the left part and the right part of the dynamic virtual panel are resized with the same scaling factor S. As shown in FIG. 11, the panel center of the dynamic virtual panel is shifted to $C_3$ after panel resizing. Specifically, at time $T_{n+1}$, the length of the resized left part (i.e., a distance between the left boundary/lower bound A2 of the adjusted dynamic virtual panel and the weighted average WA) is L3*S, and the length of the resized right part (i.e., a distance between the right boundary/upper bound B2 of the adjusted dynamic virtual panel and the weighted average WA) is M3*S.

It should be noted that the weighted average WA is fixed, and the ratio between the left part and the right part is equal to the ratio between the resized left part and the resized right part $$\left(\text{i.e., } \frac{L3}{M3} = \frac{L3*S}{M3*S}\right).$$

This implies that the ratio of a distance between A1 and $X_1$ to a distance between B1 and $X_1$ is different from the ratio of a distance between A2 and $X_1$ to a distance between B2 and $X_1$ (unless $X_1$=WA). Therefore, a piece-wise mapping function with different mapping slopes may be employed by the adjusted dynamic virtual panel. Please refer to FIG. 12, which is a diagram illustrating the mapping function of the dynamic virtual panel that is determined by the third algorithm. As a weighted average is employed by the processing circuit 114, a piece-wise mapping function determined by the third algorithm may be regarded as a weighted averaging result of a linear mapping function determined by the first algorithm and a piece-wise mapping function determined by the second algorithm.

Figure 9:
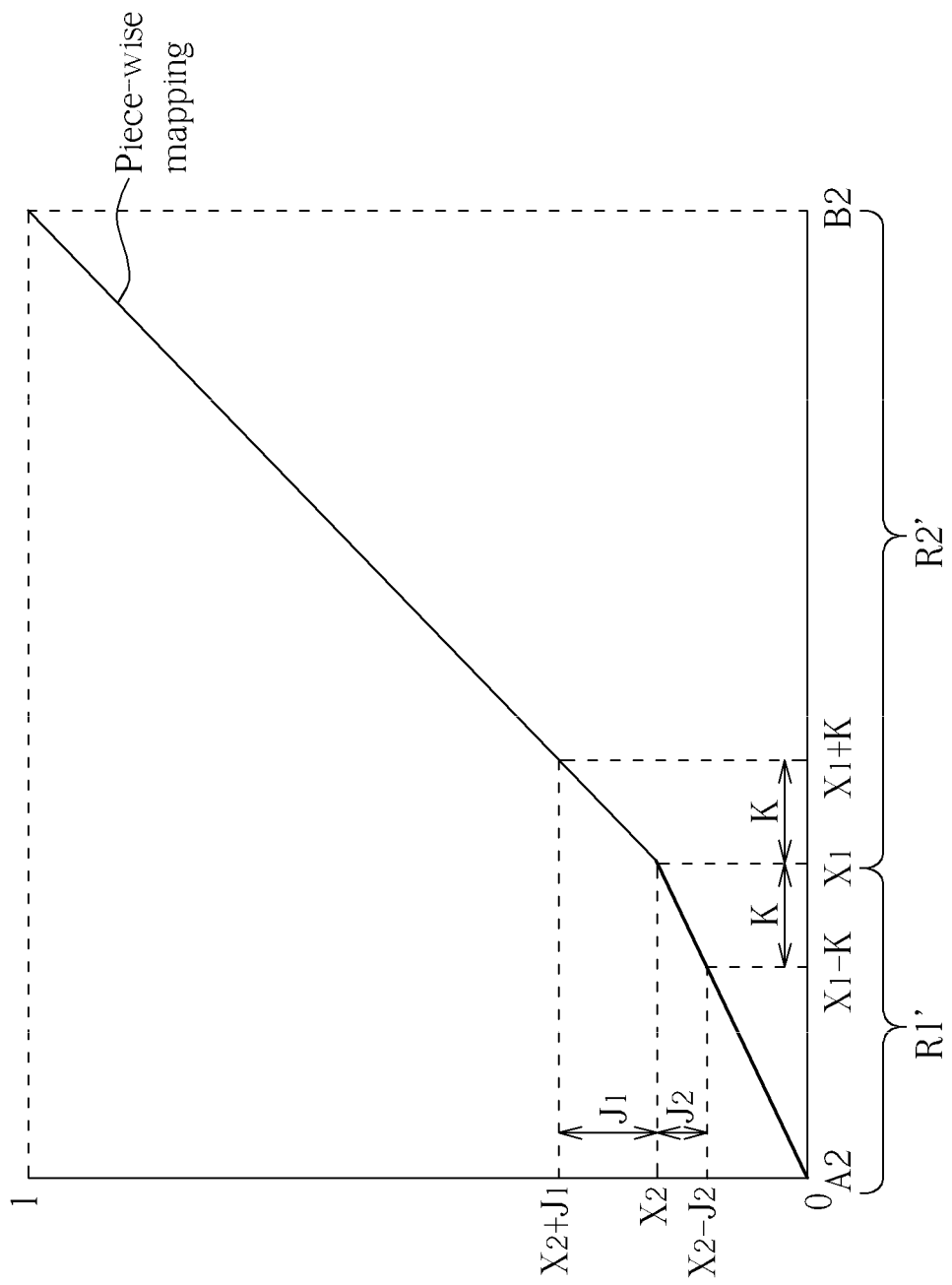
FIG. 9 is a diagram illustrating the mapping function of the dynamic virtual panel that is determined by the second algorithm according to an exemplary embodiment of the present invention.
Figure 12:
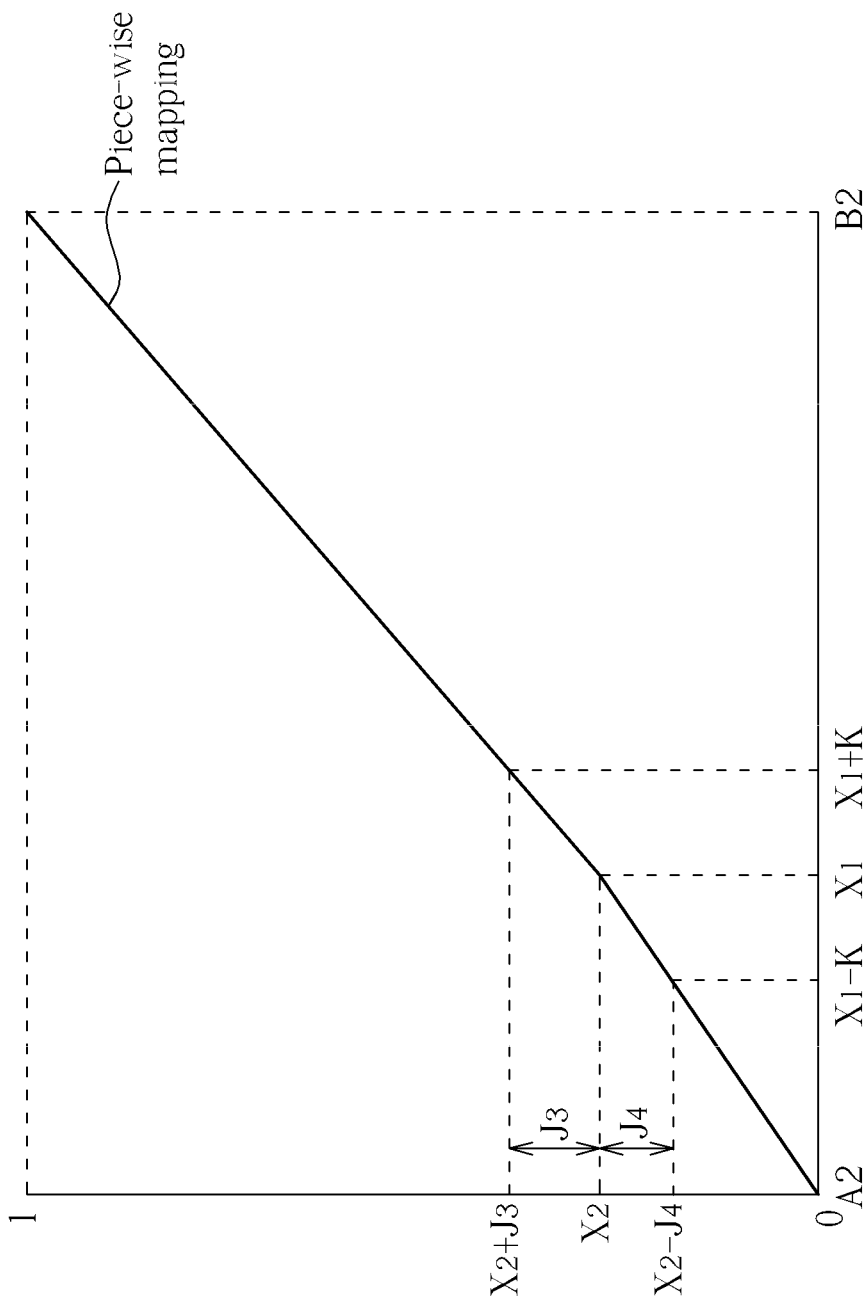
FIG. 12 is a diagram illustrating the mapping function of the dynamic virtual panel that is determined by the third algorithm according to an exemplary embodiment of the present invention.
Figure 13:
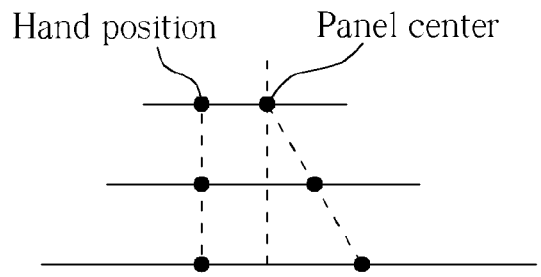
FIG. 13 is a diagram illustrating comparison between different algorithms employed for determining the panel position and mapping function of the dynamic virtual panel.
Figure 13:
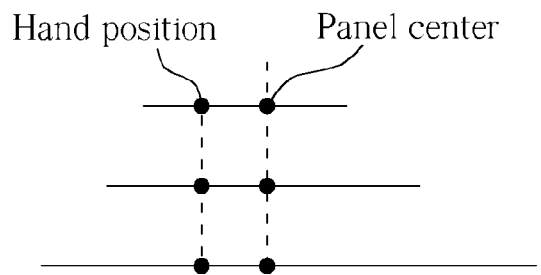
Figure 13:
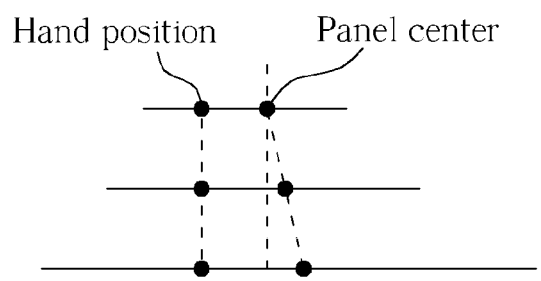

Compared to the piece-wise mapping function shown in FIG. 9, the piece-wise mapping function shown in FIG. 12 would be more similar to a linear mapping function. Please refer to FIG. 13, which is a diagram illustrating the comparison between different algorithms employed for determining the panel position and mapping function of the dynamic virtual panel. Compared to the first algorithm, the third algorithm makes the panel center stay close to an initial reference position when the virtual panel moves over time. Compared to the second algorithm, the third algorithm makes the difference between cursor displacement in different moving directions smaller.

It should be noted that the weighting factors W1 and W2 are adjustable. For example, when the weighting factor W1 is set by 1 and the weighting factor W2 is set by 0, the panel position and mapping function determined by the third algorithm is identical to that determined by the first algorithm. When the weighting factor W1 is set by 0 and the weighting factor W2 is set by 1, the panel position and mapping function determined by the third algorithm is identical to that determined by the second algorithm. Preferably, the weighting factors W1 and W2 are dynamically adjusted. For example, in a case where the virtual panel is far away from the user's hand, the weighting factor W1 is assigned a smaller value and the weighting factor W2 is assigned a larger value, thus making the virtual panel move toward a reference position faster.

Figure 14:
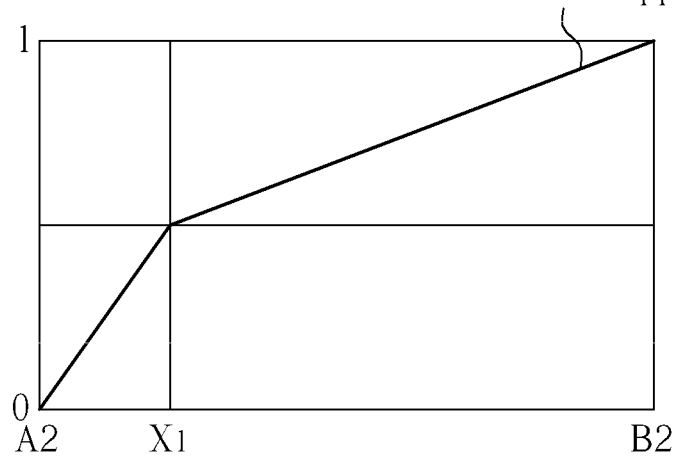
FIG. 14 is a diagram illustrating the panel position and mapping function of the dynamic virtual panel that is determined by one exemplary implementation of a fourth algorithm.
Figure 14:
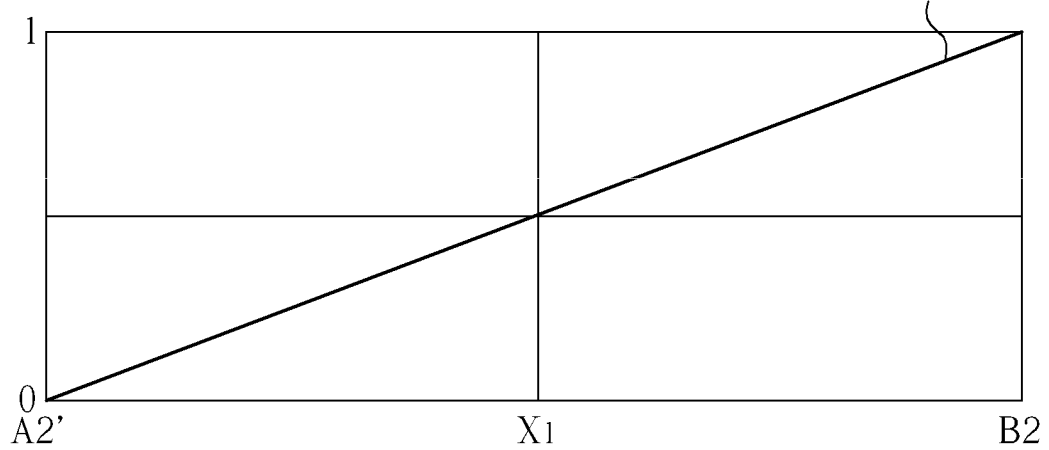

Please note that using one of the above-mentioned algorithms to determine the size, position, and/or mapping function of the dynamic virtual panel is simply one exemplary embodiment of the present invention. In practice, the processing circuit 114 may determine the size, position, and/or mapping function of the dynamic virtual panel based on other factors. For example, the mapping slopes may be taken into consideration when the processing circuit 114 is adjusting the dynamic virtual panel to change the control resolution setting. Please refer to FIG. 14, which is a diagram illustrating the panel position and mapping function of the dynamic virtual panel that is determined by one exemplary implementation of a fourth algorithm. After a panel position and a piece-wise mapping function of the dynamic virtual panel are determined, the left part is further resized to shift the left boundary/lower bound from A2 to A2', thereby making the mapping slop in the adjusted left part equal to the mapping slop in the right part. In other words, the fourth algorithm determines a preliminary piece-wise mapping function, and then resizes the left part to convert the preliminary piece-wise mapping function into a final linear mapping function.

Figure 15:
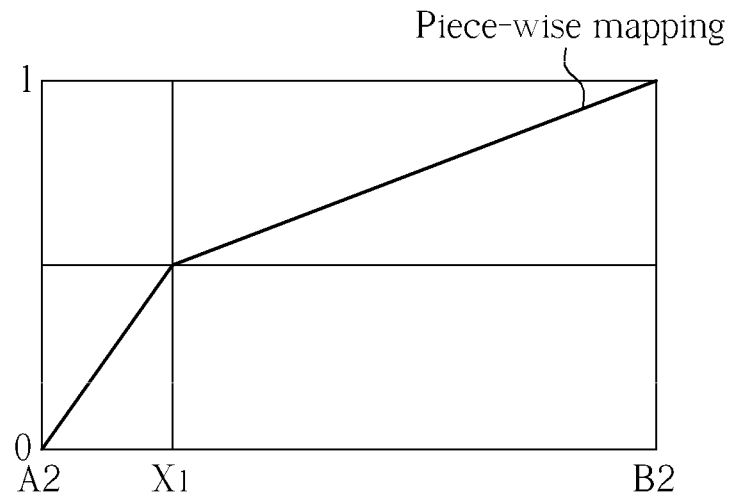
FIG. 15 is a diagram illustrating the panel position and mapping function of the dynamic virtual panel that is determined by another exemplary implementation of the fourth algorithm.
Figure 15:
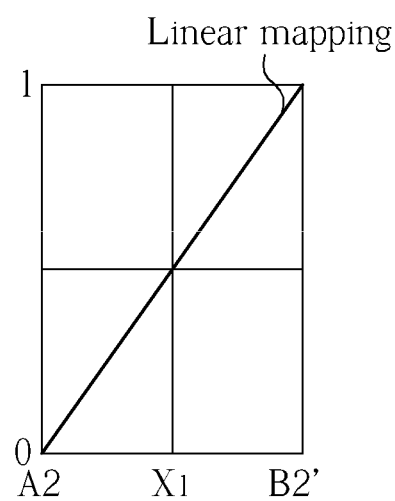

Please refer to FIG. 15, which is a diagram illustrating the panel position and mapping function of the dynamic virtual panel that is determined by another exemplary implementation of the fourth algorithm. After a panel position and a piece-wise mapping function of the dynamic virtual panel are determined, the right part is further resized to shift the right boundary/upper bound from B2 to B2', thereby making the mapping slop in the adjusted right part equal to the mapping slop in the right part. In other words, the fourth algorithm determines a preliminary piece-wise mapping function, and then resizes the right part to convert the preliminary piece-wise mapping function into a final linear mapping function.

In above examples, the dynamic virtual panel is horizontally divided into a left part and a right part according to a hand position (e.g., an X-coordinate of a target tracked object), a reference position (e.g., an X-coordinate of a panel center), or a weighted average of the hand position and the reference position. However, each of the proposed algorithms may also be applied to the dynamic virtual panel vertically divided into a top part and a bottom part according to a hand position (e.g., a Y-coordinate of the target tracked object), a reference position (e.g., a Y-coordinate of the panel center), or a weighted average of the hand position and the reference position. In this way, two-dimensional resizing of the dynamic virtual panel is realized.

Moreover, the processing circuit 114 may adaptively change the currently employed algorithm. That is, the processing circuit 114 may use one of the algorithms during one time period, and use another of the algorithms during another time period. In this way, the flexibility of the control apparatus 106 is improved greatly. Besides, assigning a linear mapping function or a piece-wise mapping function to the dynamic virtual panel is not meant to be a limitation of the present invention. Using other mapping functions is feasible as long as the spirit of dynamically adjusting the control resolution for mapping a control input in a low-resolution domain to control output in a high-resolution domain is obeyed.

Figure 16:
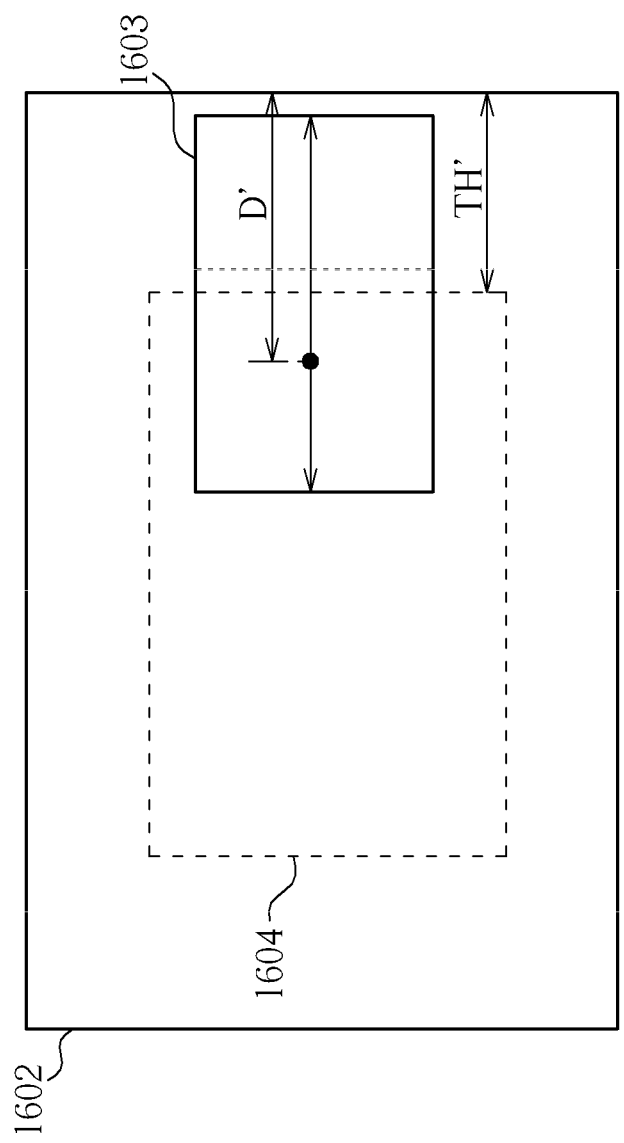
FIG. 16 is a diagram illustrating a case where the hand position is inside an inner reachable region according to an exemplary embodiment of the present invention.
Figure 17:
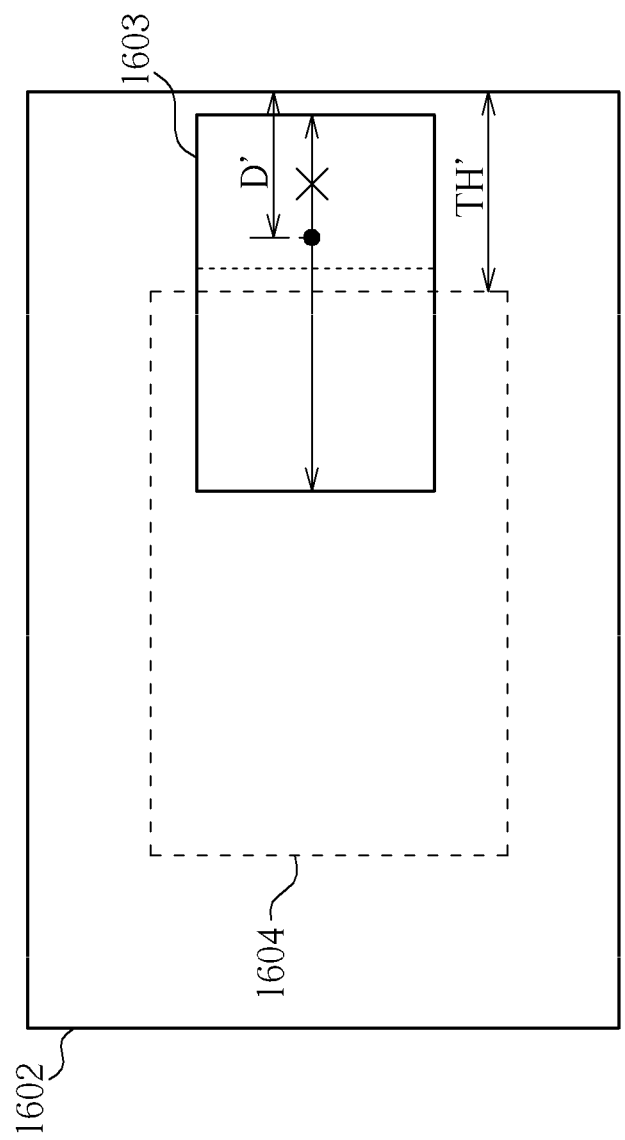
FIG. 17 is a diagram illustrating a case where the hand position is outside the inner reachable region according to an exemplary embodiment of the present invention.

In an alternative design, the reachability may be taken into consideration when the processing circuit 114 is adjusting the dynamic virtual panel to change the control resolution setting. Please refer to FIG. 16 in conjunction with FIG. 17. FIG. 16 is a diagram illustrating a case where the hand position is inside an inner reachable region according to an exemplary embodiment of the present invention. FIG. 17 is a diagram illustrating a case where the hand position is outside the inner reachable region according to an exemplary embodiment of the present invention. A reachable region 1602 defines an area which is reachable by user's hand. To put it another way, when a dynamic virtual panel is inside the reachable region 1602, the user is able to move the cursor to any position on the display screen. However, when a dynamic virtual panel is outside the reachable region 1602, the user is unable to move the cursor to anywhere even with their arms fully stretched. In this exemplary embodiment, when the hand position is inside an inner reachable region 1604, the panel resizing of the dynamic virtual panel 1603 is allowed to freely change the control resolution setting.

For example, the processing circuit 114 compares a difference between the control input of the image-based object tracking domain (e.g., a coordinate value of a target tracked object such as user's hand) and a boundary of the image-based object tracking domain (e.g., a boundary of the reachable region 1602) with a threshold TH', and accordingly generating a comparing result. For example, the threshold TH' may be a predetermined value which is set beforehand. The comparing result would indicate whether the hand position is inside the inner reachable region 1604. For example, the threshold TH' is equal to a distance between the boundary of the inner reachable region 1604 and the boundary of the reachable region 1602. As shown in FIG. 16, the difference D' is larger than the threshold TH'. Therefore, the dynamic virtual panel 1603 is free to resize because the processing circuit 114 acknowledges that the hand position is inside the inner reachable region 1604. However, as shown in FIG. 17, the difference D' is smaller than the threshold TH'. Hence, the processing circuit 114 determines that the hand position is outside the inner reachable region 1604, and restricts the panel resizing operation. For example, the right part of the dynamic virtual panel 1603 is not allowed to be enlarged so that the right boundary of the dynamic virtual panel 1603 exceeds the right boundary of the reachable region 1602, and the change of the corresponding control resolution (i.e., the corresponding mapping slope) is restricted accordingly.

In another alternative design, the insufficient resolution may be taken into consideration when the processing circuit 114 is adjusting the dynamic virtual panel to change the control resolution setting. When the control input is near the upper/lower bound of the image-based object tracking domain while the control output is far from the upper/lower bound of the control domain, the dynamic virtual panel only has a small area between the current hand position and the upper/lower bound that is available for controlling a cursor to move within a large area between the current cursor position and the upper/lower bound of the display screen, leading to the insufficient resolution.

Figure 18:
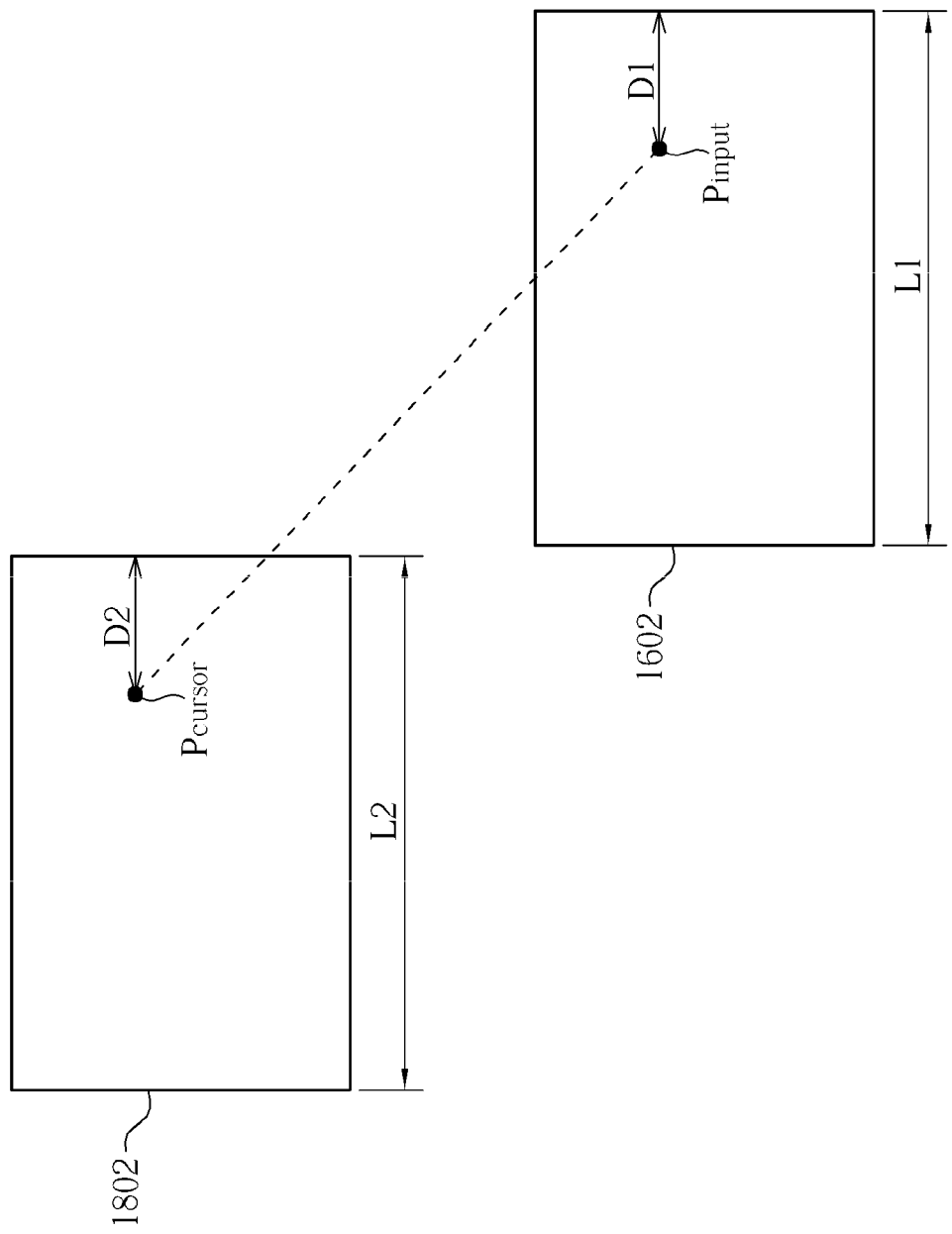
FIG. 18 is a diagram illustrating detection of the insufficient resolution.

Please refer to FIG. 18, which is a diagram illustrating detection of the insufficient resolution. The processing circuit 114 compares a first difference D1 between the control input $P_{input}$ of the image-based object tracking domain (e.g., a coordinate value of a target tracked object such as user's hand) and a boundary of the image-based object tracking domain (e.g., the boundary of the aforementioned reachable region 1602) with a first threshold TH1, and accordingly generating a first comparing result. For example, the first threshold TH1 may be a predetermined value which is set beforehand. Besides, the processing circuit 114 compares a second difference D2 between the control output $P_{cursor}$ of the control domain (e.g., a coordinate value of a cursor in a display screen 1802) and a boundary of the control domain (e.g., a boundary of the display panel 1802) with a second threshold TH2, and accordingly generating a second comparing result. As D1 stands for the available control input resolution, and D2 stands for the available control output resolution, to avoid insufficient resolution, we need to enforce D1>D2. To make the detection of the insufficient resolution irrelevant to the size of the control input domain (i.e. L1) and the size of the control output domain (i.e. L2), we need to enforce D1/L1>=D2/L2. In practice, the relationship D1/L1>=1/k*D2/L2 needs to be kept. It means that D2=<[(D1/L1)*L2]*K, wherein 'K' is a constant, and we can set [(D1/L1)*L2] to be the second threshold TH2. In other words, the second threshold TH2 in this embodiment is not a fixed/predetermined value, and would be updated each time the first difference D1 is changed due to movement of user's hand.

Therefore, the aforementioned first comparing result would indicate whether the control input (e.g., hand position) is near the upper/lower bound of the image-based object tracking domain. For example, when the first comparing result indicates that the first difference D1 is smaller than the first threshold TH1, this implies that the control input is near the upper/lower bound of the image-based object tracking domain. It should be noted that the control output actually would have a variable distance between its coordinate in the control domain and the boundary of the control domain due to the dynamically adjusted size and/or position of the dynamic virtual panel 1603. Considering a special case where the control input $P_{input}$ having a distance between its coordinate in the image-based object tracking domain and the boundary of the image-based object tracking domain equal to D1 is mapped to a control output having a distance between its coordinate in the control domain and the boundary of the control domain equal to (D1/L1)*L2. Therefore, the aforementioned second comparing result would indicate whether the relative position of the control output in the control domain is far from the relative position of the control input in the image-based object tracking domain.

For example, when the second comparing result indicates that the second difference D2 is larger than the second threshold TH2, this implies that the relative position of the control output in the control domain is far from the relative position of the control input in the image-based object tracking domain (i.e., the control output specified by the second difference D2 may be regarded as being far from the upper/lower bound of the control domain due to the fact that a particular cursor position specified by the second threshold TH2 (i.e., (D1/L1)*L2) is found closer to the upper/lower bound of the control domain). When the first comparing result indicates that the first difference D1 is smaller than the first threshold TH1 and the second comparing result indicates that the second difference D2 is larger than the second threshold TH2, the processing circuit 114 therefore acknowledges occurrence of the insufficient resolution.

In one exemplary implementation, the processing circuit 114 may decrease the panel size of the dynamic virtual panel to thereby decrease at least one control resolution defined in the control resolution setting. In this way, the user is capable of controlling a cursor in a large area of the display screen by using a small area available in the dynamic virtual panel due to the decreased control resolution. In another exemplary implementation, the processing circuit 114 may adjust the position (i.e., panel center) of the dynamic virtual panel to mitigate the insufficient resolution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a control output in a control domain, comprising:
   obtaining a control input of an input domain, wherein the control input includes at least a previous input value and a current input value; and
   dynamically adjusting a control resolution setting which defines a number of units changed in the control domain when a unit is changed in the input domain, and converting the control input of the input domain into the control output in the control domain according to the control resolution setting,
   wherein the control output includes at least a previous output value and a current output value corresponding to at least the previous input value and the current input value, respectively; the control resolution setting for the current input value is determined according to at least the previous input value; and the current output value is identical to the previous output value when the current input value and the previous input value are generated in response to a same user input;
   wherein the step of dynamically adjusting the control resolution setting comprises:
   comparing a first difference between the control input of the input domain and a boundary of the input domain with a first threshold, and accordingly generating a first comparing result;
   comparing a second difference between the control output of the control domain and a boundary of the control domain with a second threshold, and accordingly generating a second comparing result; and
   referring to the first comparing result and the second comparing result to dynamically adjust at least one control resolution defined in the control resolution setting.

2. The method of claim 1, wherein the step of referring to the first comparing result and the second comparing result to dynamically adjust the at least one control resolution comprises:
   when the first comparing result indicates that the first difference is smaller than the first threshold and the second comparing result indicates that the second difference is larger than the second threshold, decreasing the at least one control resolution.

3. A method for determining a control output in a control domain, comprising:
   obtaining a control input of an input domain, wherein the control input includes at least a previous input value and a current input value; and
   dynamically adjusting a control resolution setting which defines a number of units changed in the control domain when a unit is changed in the input domain, and converting the control input of the input domain into the control output in the control domain according to the control resolution setting,
   wherein the control output includes at least a previous output value and a current output value corresponding to at least the previous input value and the current input value, respectively; the control resolution setting for the current input value is determined according to at least the previous input value; and the current output value is identical to the previous output value when the current input value and the previous input value are generated in response to a same user input;
   wherein the step of dynamically adjusting the control resolution setting comprises:
   comparing a first difference between the control input of the input domain and a boundary of the input domain with a first threshold, and accordingly generating a first comparing result;
   comparing a second difference between the control output of the control domain and a boundary of the control domain with a second threshold, and accordingly generating a second comparing result; and dynamically adjusting a size of a dynamic virtual panel according to the first comparing result and the second comparing result, wherein the dynamic virtual panel determines the control resolution setting.

4. The method of claim 3, wherein the step of dynamically adjusting the size of the dynamic virtual panel according to the first comparing result and the second comparing result comprises:

when the first comparing result indicates that the first difference is smaller than the first threshold and the second comparing result indicates that the second difference is larger than the second threshold, decreasing the size of the dynamic virtual panel.

5. A method for determining a control output in a control domain, comprising:

obtaining a control input of an input domain, wherein the control input includes at least a previous input value and a current input value; and dynamically adjusting a control resolution setting which defines a number of units changed in the control domain when a unit is changed in the input domain, and converting the control input of the input domain into the control output in the control domain according to the control resolution setting, wherein the control output includes at least a previous output value and a current output value corresponding to at least the previous input value and the current input value, respectively; the control resolution setting for the current input value is determined according to at least the previous input value; and the current output value is identical to the previous output value when the current input value and the previous input value are generated in response to a same user input;

wherein the step of dynamically adjusting the control resolution setting comprises:

comparing a first difference between the control input of the input domain and a boundary of the input domain with a first threshold, and accordingly generating a first comparing result;

comparing a second difference between the control output of the control domain and a boundary of the control domain with a second threshold, and accordingly generating a second comparing result; and dynamically adjusting a position of a dynamic virtual panel according to the first comparing result and the second comparing result, wherein the dynamic virtual panel determines the control resolution setting.

6. A method for determining a control output in a control domain, comprising:

obtaining a control input of an input domain, wherein the control input includes at least a previous input value and a current input value; and dynamically adjusting a control resolution setting which defines a number of units changed in the control domain when a unit is changed in the input domain, and converting the control input of the input domain into the control output in the control domain according to the control resolution setting, wherein the control output includes at least a previous output value and a current output value corresponding to at least the previous input value and the current input value, respectively; the control resolution setting for the current input value is determined according to at least the previous input value; and the current output value is identical to the previous output value when the current input value and the previous input value are generated in response to a same user input;

wherein the step of dynamically adjusting the control resolution setting comprises:

dynamically adjusting a position of a dynamic virtual panel based on a weighted average of the control input in the input domain and a reference position, wherein the dynamic virtual panel determines the control resolution setting.

* * * * *